United States Patent
Goshey (10) Patent No.: US 8,527,907 B2
(45) Date of Patent: Sep. 3, 2013

(54) SCREEN RELAYOUT

(75) Inventor: Michael Goshey, Granite Bay, CA (US)

(73) Assignee: Adobe Systems Incorporated, San Jose, CA (US)

( * ) Notice: Subject to any disclaimer, the term of this patent is extended or adjusted under 35 U.S.C. 154(b) by 250 days.

(21) Appl. No.: 11/496,750

(22) Filed: Jul. 31, 2006

(65) Prior Publication Data

US 2013/0125050 A1    May 16, 2013

(51) Int. Cl.
*G06F 3/048* (2013.01)
*G06F 3/033* (2006.01)

(52) U.S. Cl.
USPC .......................................... 715/863; 715/764

(58) Field of Classification Search
USPC .................................. 715/788, 792
See application file for complete search history.

(56) References Cited

U.S. PATENT DOCUMENTS

| | | | | |
|---|---|---|---|---|
| 5,060,170 A * | 10/1991 | Bourgeois et al. | ............ | 715/788 |
| 5,561,757 A * | 10/1996 | Southgate | ...................... | 715/790 |
| 5,577,187 A * | 11/1996 | Mariani | ........................ | 715/792 |
| 5,649,216 A | 7/1997 | Sieber | | |
| 5,712,995 A * | 1/1998 | Cohn | ............................ | 715/792 |
| 5,838,318 A * | 11/1998 | Porter et al. | .................. | 715/790 |
| 5,841,435 A * | 11/1998 | Dauerer et al. | ............... | 715/775 |
| 6,008,809 A * | 12/1999 | Brooks | ......................... | 715/792 |
| 6,195,094 B1 * | 2/2001 | Celebiler | ...................... | 715/764 |
| 6,310,631 B1 * | 10/2001 | Cecco et al. | ................... | 715/792 |
| 6,396,500 B1 * | 5/2002 | Qureshi et al. | ................ | 345/473 |
| 6,826,727 B1 | 11/2004 | Mohr et al. | | |
| 7,013,431 B2 * | 3/2006 | Taylor et al. | ................... | 715/788 |
| 7,013,432 B2 * | 3/2006 | Taylor et al. | ................... | 715/788 |
| 7,124,360 B1 * | 10/2006 | Drenttel et al. | ............... | 715/205 |
| 7,188,317 B1 * | 3/2007 | Hazel | ............................ | 715/804 |
| 7,313,765 B2 * | 12/2007 | Taylor et al. | ................... | 715/788 |
| 7,318,196 B2 * | 1/2008 | Crow et al. | .................... | 715/716 |
| 7,350,154 B2 * | 3/2008 | Anderson et al. | ............. | 715/778 |
| 7,360,169 B2 * | 4/2008 | Duperrouzel et al. | ........ | 715/788 |
| 7,370,284 B2 * | 5/2008 | Andrea et al. | ................ | 715/788 |
| 7,484,182 B1 * | 1/2009 | Smith | ........................... | 715/794 |
| 7,549,127 B2 * | 6/2009 | Chasen et al. | ................ | 715/788 |
| 7,818,684 B1 * | 10/2010 | Smith | ........................... | 715/794 |
| 2004/0261036 A1 * | 12/2004 | Vedbrat et al. | ................ | 715/779 |
| 2005/0041045 A1 * | 2/2005 | Plut | ............................... | 345/660 |

FOREIGN PATENT DOCUMENTS

EP    0784294    7/1997

OTHER PUBLICATIONS

O'Hara, Shelley, Easy Microsoft Windows XP Home Edition, Second Edition, 2003, pp. 2-3 (see attached) Getting Started Task 7: Resizing a Window.*

(Continued)

*Primary Examiner* — David Phantana Angkool
(74) *Attorney, Agent, or Firm* — Wolfe-SBMC (57) ABSTRACT

Briefly, in accordance with one or more embodiments, the contents of a window may be reflowed to accommodate one or more of a change in the size or aspect ratio of the window, a change in size of one or more objects or subwindows within the window, and/or the addition or deletion of the contents of the window. The contents of the window may be reflowed proportionally with the event causing the relayout of the window contents such that the contents of the window may be fully displayed within the window area after the event, and/or the relationship of the window contents may be at least partially maintained.

29 Claims, 5 Drawing Sheets

(56) References Cited

OTHER PUBLICATIONS

O'Hara, Shelley, Easy Microsoft Windows XP Home Edition, Second Edition, 2003, pp. 1-2 (see attached) Part 3 Working with Folders, Task 5: Selecting Folder.*

Miser, Brad; Special Edition Using Mac OS X; Que; Pub Date: Dec. 5, 2001; Ch. 3 "Working with Finder Windows", and Ch 13 "Using Sherlock to Search the Web", see attahced.*

* cited by examiner

SCREEN RELAYOUT

BACKGROUND

In windows based computing systems in which data may be displayed on a display and manipulated via a graphical user interface, resizing of the windows, for example to accommodate the aspect ratios of different sized monitors, may result in the window being resized but the contents of the windows, including subwindows or panes, may not be resized to accommodate the new layout of the global window. As a result, when the aspect ratio of a window is changed to result in the window occupying a larger area, the contents of the window may not be centered within the window. Alternatively, when the aspect ratio of a window is changed to result in the window occupying a smaller area, some of the contents of the window may not be displayed since the contents of the window may logically extend beyond the boundaries of the smaller sized window. Such resizing of the window without resizing of the contents of the window can be a source of frustration or inconvenience to the user. Similar results may occur when some of the contents of the window are deleted, or when additional content is added to the existing content of the window.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

An algorithm and/or process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, reflow may refer to where the contents of a document, file, and or window or subwindow may be rearranged to alter the layout, order, and/or viewability of the content of the document, file, window, or subwindow. A pane may refer to a type of object and/or an area or portion of a window within a graphical user interface that may contain data, media content, control icons, or other content or controls, that is contained within the boundaries of the pane. A pane may be tabbed in that it contains one or more layers within its boundaries that are selectable via a graphical tab to display a selected layer. In one or more embodiment, transient may refer to being in a state for a brief and/or temporary period of time, and/or passing with time and/or a temporary state of being. However, these are merely example definitions of terms relating to graphical user interfaces and/or computing platforms and/or the like, and the scope of claimed subject matter is not limited in this respect.

Figure 1:
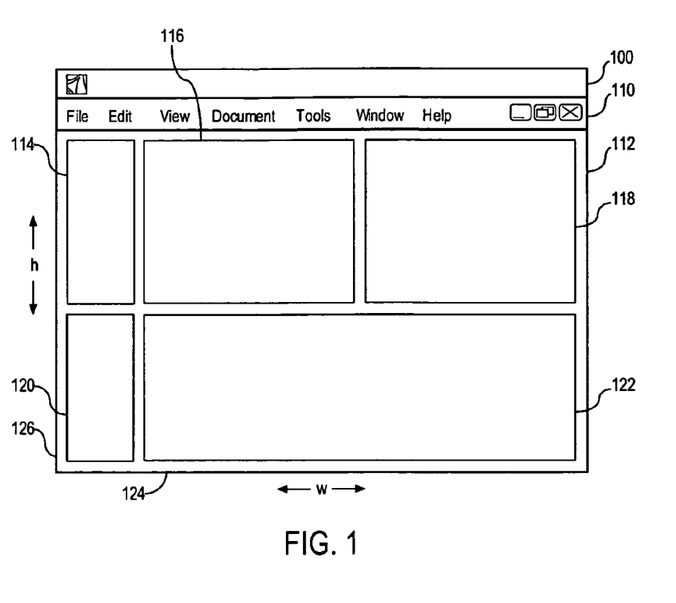
FIG. 1 is a diagram of a graphical user interface of a software program showing a screen layout for a first aspect ratio in accordance with one or more embodiments.

Referring now to FIG. 1, a diagram of a graphical user interface of a software program showing a screen layout for a first aspect ratio in accordance with one or more embodiments will be discussed. As shown in FIG. 1, a software program may comprise a graphical user interface (GUI) capable of being displayed on a display of an information handling system. A graphical use interface generally may refer to an interface for a software program that is capable of utilizing video graphics in conjunction with an input device to provide commands to the software program. Graphical user interface 100 may comprise window 110 in which various icons, data and/or other information or may be rendered. A window generally may refer to an area on a display in which a graphical user interface may be rendered. Window 110 may include client area 112 in which one or more panes 114, 116, 118, and/or 120 may be rendered. A pane may refer to a subsection of graphical user interface 100 in which one or more program functions of the software program and/or data may be rendered. In one or more embodiments, the software program may comprise a program such as Adobe® Premiere® Pro 2.0 type software, Adobe® Premiere® Elements type software, or Adobe® Acrobat® type software, or the like, available from Adobe Systems Incorporated of San Jose, Calif., USA. However, these are merely example types of software programs, and the scope of the claimed subject matter is not limited in these respects.

Figure 2:
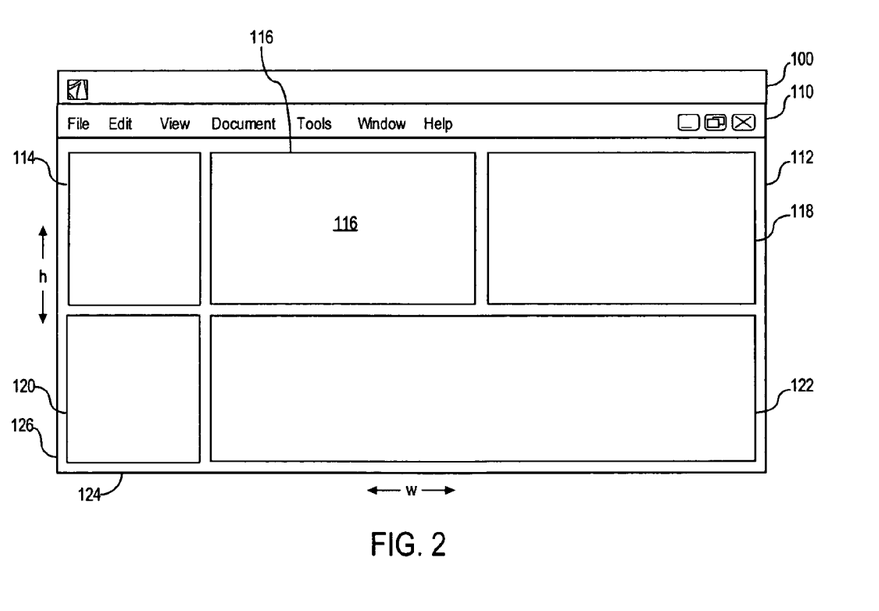
FIG. 2 is a diagram of a graphical user interface of a software program showing a screen layout for a second aspect ratio in accordance with one or more embodiments.

As shown in FIG. 1, window 110 may have a width 124 and a height 126 that may define a horizontal span and a vertical span of window 110 in which contents of window 110 may be displayed. When window 110 is initially opened or displayed on a display, window 110 may be open by default to a predetermined ratio of width 124 to height 126. Typically, such a default predetermined ratio may by the same aspect ratio, or nearly the same, as the aspect ratio of the display on which window 110 is displayed. For example, a typical aspect ratio of a monitor or a display may be 4:3, which may be a first aspect ratio. In such an embodiment, the aspect ratio of width 124 to height 126 of window 110 may be 4:3 or nearly 4:3. In some embodiments, when window 110 is initially opened or displayed, window 110 may be maximized to fill up all of the area, or nearly all of the area, of the monitor or display on which window 110 is rendered, for example by reflowing the contents of the panes and/or client area 112. In such an embodiment, window 110 may have the same or nearly the same aspect ratio as the display area of the monitor or display, which may be 4:3 for example. In other embodiments, window 110 may be initially opened or displayed to occupy an area that is smaller in size than a full area of the display. In such embodiments, window 110 may still retain the same or nearly the same 4:3 aspect ratio. For example, when a user actuates a restore down button or similar on graphical user interface 100 when window is maximized to occupy a full area or nearly full area of the display, window 110 may be resized to occupy a smaller area of the display, for example via reflowing of the contents of the panes and/or client area 112, while still generally retaining a 4:3 aspect ratio of width 124 to height. In yet further embodiments, window 110 may be resized to have a different width 124 and/or height 126 or combinations thereof, by the user via graphical user interface 100. In such embodiments, the ratio of width 124 to height may be changed to something different than the 4:3 aspect ratio. In other embodiments, the monitor or display natively may have generally a different width to height ratio than 4:3, for example a 16:9 ratio. If window 110 is opened to have a 4:3 aspect ratio or nearly 4:3 ratio as shown in FIG. 1, and the user actuates a maximize button or the like via graphical user interface 100, window 110 may be resized to fill all or nearly all of the area of the monitor or display. In the case where the monitor or display has a 16:9 type aspect ratio, window 110 may be resized to likewise have a 16:9 aspect ratio or the like as shown in FIG. 2. Alternatively, the ratio of window 110 may be selected via preset aspect ratios in the software program, for example via a pull down menu or icons of graphical user interface 100. In accordance with one or more embodiments, one or more of panes 114-122 may be resized to accommodate a new aspect ratio of window 110 when the aspect ratio is changed to provide a new layout of panes 112-122 within client area 112 of window 110. Such resizing may comprise reflowing the contents of the panes and/or client area 112 or otherwise reflowing the contents of window 110. However, these are merely examples of how an aspect ratio of window 110 may be changed, and the layout of the contents of window may be rearranged in a new layout for example via reflow, and the scope of the claimed subject matter is not limited in these respects.

Referring now to FIG. 2, a diagram of a graphical user interface of a software program showing a screen layout for a second aspect ratio in accordance with one or more embodiments. As compared with the aspect ratio of window 110 as shown in FIG. 1, which generally may be a 4:3 aspect ratio or the like, the aspect ratio of window 110 as shown in FIG. 2 generally may be a 16:9 aspect ratio of the like. When window 110 is resized from a first aspect ratio as shown in FIG. 1 to a second aspect ratio as shown in FIG. 2, client area 112 may occupy a larger area as a result. In one or more embodiments, panes 114-122 may be sized to occupy most or all of the area of client area 112, for example by reflowing the contents of the panes and/or client area 112. When the aspect ratio of window 112 is changed, in one or more embodiments the layout of panes 114-122 may be changed in accordance with the changed area and dimensions of client window 112. In one or more embodiments, panes 114-122 may be resized to occupy most or nearly most of the area of client window 112. Furthermore, the size and location relation ship of a given pane to one or more other panes may be retained when resized, for example by reflowing the contents of the panes and/or client area 112. For example, when window 110 is resized from a first layout as shown in FIG. 1 to a second layout as shown in FIG. 2, since the width of client area 112 has increased, the widths of one or more of panes 114-122 may likewise be increased so that panes 112-114 may occupy most or all of the area of client area in the second layout. Similarly, the heights of one or more of panes 114-122 may be increased if the vertical dimension of client area 112 has increased. Conversely, when the aspect ratio of window 110 is changed from that shown in FIG. 2 to that shown in FIG. 1 in which the area of client window 112 may be decreased, the layout of panes 114-122 may similarly be decreased so that the relative size and spacing relationship of one or more panes to one or more other panes generally be retained as the aspect ratio of window 110 is changed. Thus, in one or more embodiments, if the aspect ratio of window 110 is changed to result in a new area of client area 112, for example by changing from a first aspect ratio as shown in FIG. 1 to a second aspect ratio as shown in FIG. 2, or by changing from the second aspect ratio as shown in FIG. 2 to the first aspect ratio as shown in FIG. 1, the layout of one or more of panes 112-114 may be changed to accommodate the new area of client area 112 in a manner that generally may retain one or more characteristics of the previous layout of panes 114-122 in client area 112, for example by reflowing the contents of the panes and/or client area 112.

Figure 3:
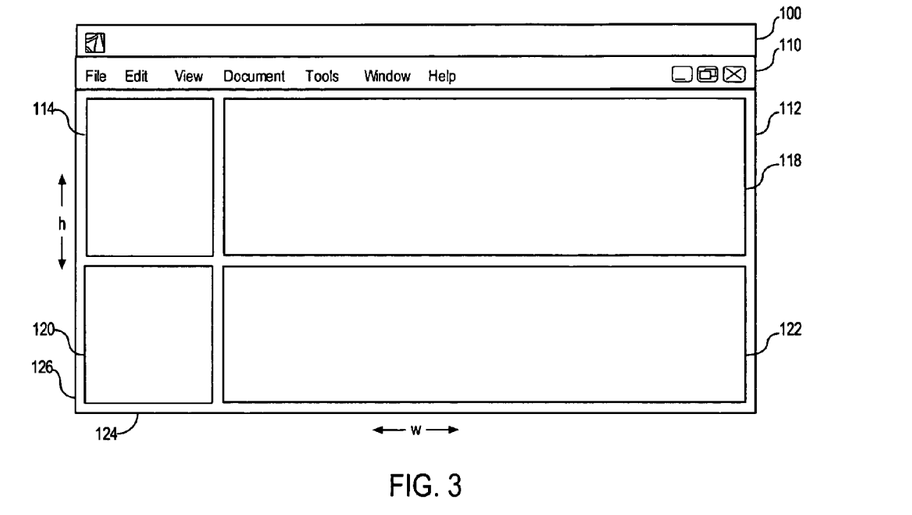
FIG. 3 is a diagram of a graphical user interface of a software program showing a screen layout responsive to a removed pane in accordance with one or more embodiments.

Referring now to FIG. 3, a diagram of a graphical user interface of a software program showing a screen layout responsive to a removed pane in accordance with one or more embodiments will be discussed. As shown in FIG. 3, the layout of panes 114-122 within client area has been changed from that shown in FIG. 2, namely by the deletion and/or removal of pane 116 from client area 112. As a result, pane 118 has increased in size, for example by laterally expanding in area to fill in the void left in client area 112 as a result of the removal of pane 116 from client area 112. Thus, pane 118 may expand in size until the remaining panes, pane 114, 118, 120, and 122 fill all or nearly all of client area 112. In such an embodiment, since only the size of pane 118 was altered, but not that of remaining panes 114, 120 and 122, the relationship of the remaining panes 114, 120 and 122 was unchanged, or relatively unchanged. Furthermore, the relationship between pane 118 and the remaining panes 120 and 122 below pane 118 may be preserved in a vertical direction. Conversely, if pane 116 is added to client area 112 of window 110 as shown in FIG. 3, the layout of panes 114-122 may change from first layout as shown in FIG. 3 to a second layout as shown in FIG. 2. In such an embodiment, the size of pane 118 may be reduced in a lateral direction to accommodate the addition of pane 116 in the layout of window 110 shown in FIG. 2, and the relationship among the remaining panes 114, 120, and 122 may remain unchanged. Furthermore, the relationship between pane 118 and the remaining panes 120 and 122 below pane 118 may be preserved in a vertical direction. In general, the addition and/or deletion of a pane to and/or from client area 112 of window 110 may result in a relayout of a subset of panes within client area 112, for example to preserve a relationship between the other panes in client area 112, and/or to maximize the area which the panes occupy within client area 112, for example by reflowing the contents of the panes and/or client area 112, although the scope of the claimed subject matter is not limited in these respects.

Figure 4:
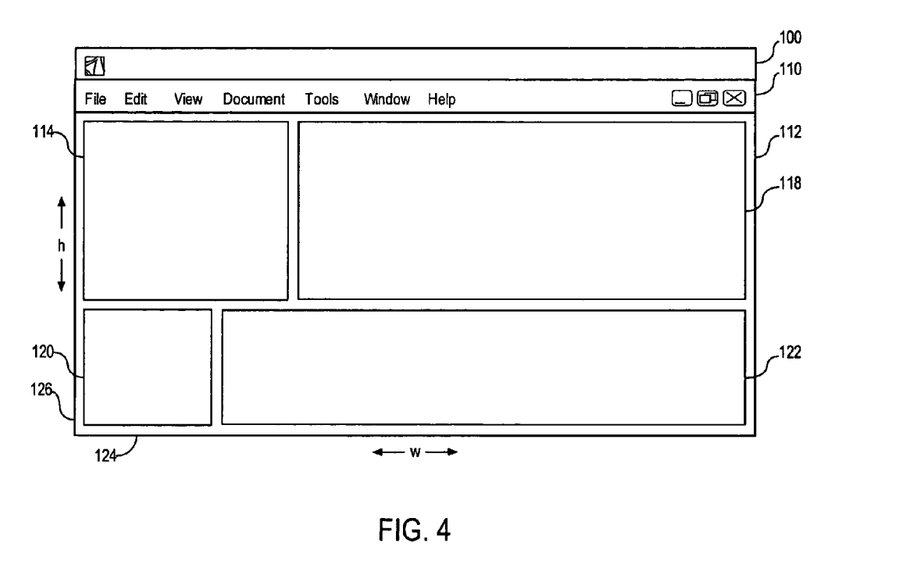
FIG. 4 is a diagram of a graphical user interface of a software program showing a screen layout for a resized pane in accordance with one or more embodiments.

Referring now to FIG. 4, a diagram of a graphical user interface of a software program showing a screen layout for a resized pane in accordance with one or more embodiments will be discussed. As shown in FIG. 4, a layout of panes 114-122 within client area 112 may be arranged in a new layout when one or more of panes 114-122 is resized. For example, the layout of panes 114-122 shown in FIG. 4 may be a result of increasing the area of pane 114 from an initial area of pane 114 shown for example in FIG. 3. In one embodiment, when pane 114 is enlarged, it may increase in height or width or combinations thereof with respect to the other panes 118, 120, and/or 122. As the width of pane 114 is increased and encroaches on the area of pane 118 in a lateral direction, the width of pane 118 may be decreased proportionally with the increased width of pane 114 to accommodate the larger area occupied by pane 114, wherein pane 114 and pane 118 may be sized relative to one another to ensure, for example, that panes 114 and 118 occupy all or nearly all of client area 112 along with panes 120 and 122, for example by reflowing the contents of the panes and/or client area 112. Similarly, as the height of pane 114 is increased and encroaches on the area of pane 120 and/or pane 122 disposed below pane 114, or above pane 120 and/or pane 122 if disposed in such an arrangement, pane 120, the height of pane 120 and/or pane may be decreased proportionally with the increased height of pane 114 to accommodate the larger area occupied by pane 114, wherein pane 114, pane 120, and/or pane 122 may be sized relative to one another to ensure, for example, that panes 114, 120, and pane 122 occupy all or nearly all of client area 112 along with pane 118, for example by reflowing the contents of the panes and/or client area 112. Conversely, when a pane such as pane 114 is decreased in size, the layout of the panes in client area may be rearranged from a first layout as shown in FIG. 4 to a second layout as shown in FIG. 3 in a manner similar to the manner in which a new layout may result from an increase in the size of pane as discussed, above. In general, a pane may be increased and/or decreased in size, which may result in a new layout of the panes, and/or a subset of the panes, within client area 112 to accommodate the increased size or decreased size of the resized pane. In one or more embodiments, the area occupied by all or nearly all the panes may remain constant or nearly constant from a given layout to a new layout, for example the panes may be resized to maintain the occupancy of the panes the whole or nearly whole area of client area 112. Likewise, are relationship between the panes may be otherwise held constant or nearly constant from one layout to another layout, for example by reflowing the contents of the panes and/or client area 112. Furthermore, any change in one pane and a resulting change in one or more other panes may occur proportionally, for example if the size of one pane increased in one direction by a given number of pixels, the size of an affected pane may be decreased by the same, or nearly the same, number of pixels along that same direction. However, these are merely examples of how a layout of panes within client area 112 may be arranged in response to the resizing of one or more panes, and the scope of the claimed subject matter is not limited in these respects.

Figure 5:
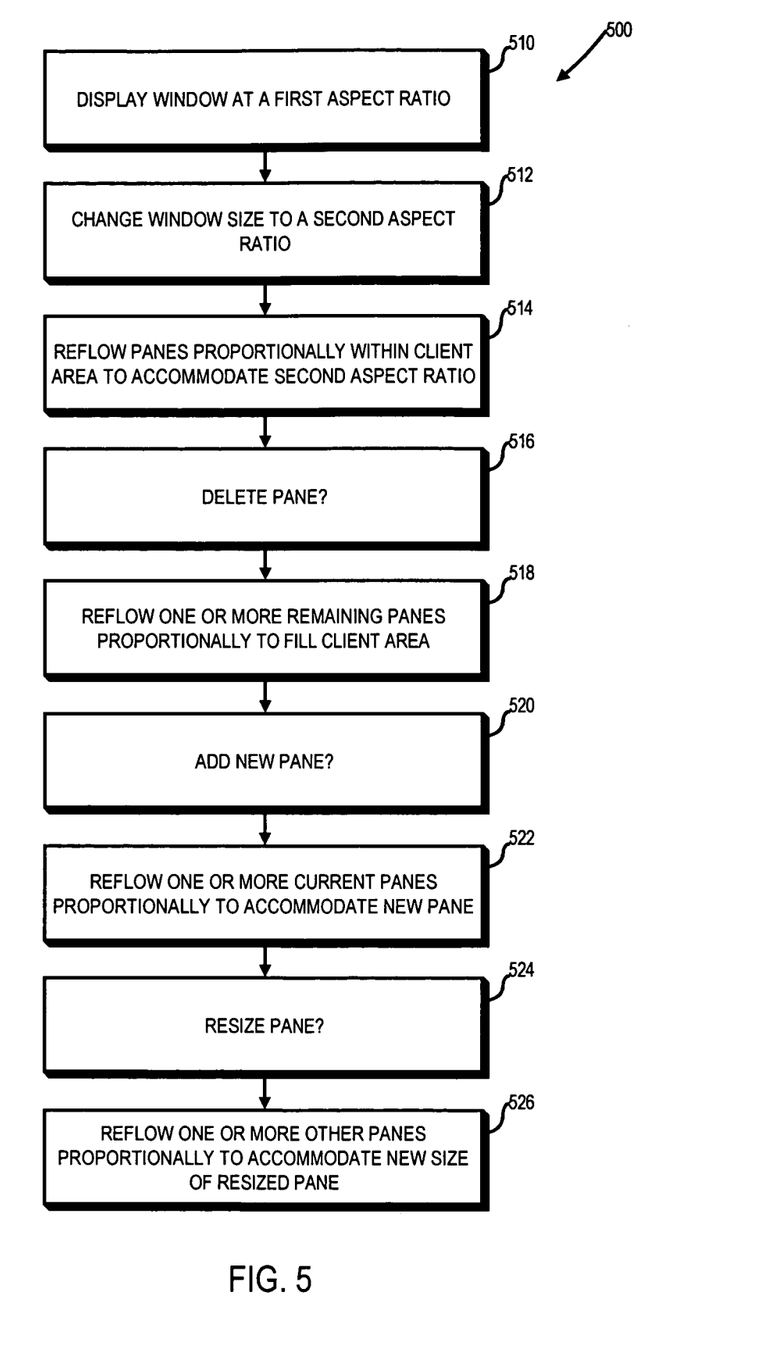
FIG. 5 is a flow diagram of a method for relaying out a screen in accordance with one or more embodiments.

Referring now to FIG. 5, a flow diagram of a method for relaying out a screen in accordance with one or more embodiments will be discussed. Method 500 as shown in FIG. 5 may include more or fewer blocks, wherein some blocks of method 500 may not be executed in some embodiments, and in other embodiments additional blocks may be executed in addition to some or all of the blocks as shown in FIG. 5. Furthermore, method 500 may be executed in one or more alternative orders than the order of blocks shown in FIG. 5, and the scope of the claim subject matter is not limited in these respects. If method 500 is executed, a window may be displayed at a first aspect ratio at block 510. Optionally, if the size of the window is changed to accommodate and/or be displayed in a second aspect ratio at block 512, one or more panes or one or more subsets of panes in a client area of the window may be reflowed at block 514, optionally proportionally, within the client area in order to accommodate the second aspect ratio of the window. Optionally, if one or more of the panes within the client area of the window are deleted at block 516 from the client area, one or more of the remaining panes or one or more subsets of the remaining panes may be reflowed, optionally proportionally, to ensure the client area of the window is filled, or nearly filled, by the remaining panes. Optionally, if one or more panes are added at block 520 to the client area of the window, one or more of other panes or one or more subsets of panes may be reflowed at block 522, optionally proportionally, to accommodate the new pane, wherein the panes may occupy the same area, or nearly the same area, as the panes occupied prior to the new pane being added to the client area. Optionally, if one or more panes within the client area are resized at block 524, one or more other panes or one or more subsets of panes may be reflowed at block 526, optionally proportionally, to accommodate the new size of the resized pane. Method 500 is one example method having example blocks that may be executed to change the layout of a window from a first layout to a second layout in response to one or more resizing and/or addition or deletion events, and the scope of the claimed subject matter is not limited in these respects. In one or more embodiments, method 500 may be executed by a processor and/or an information handling system to cause the processor or information handling system to be configured to execute one or more blocks of method 500, although the scope of the claimed subject matter is not limited in this respect. It should be noted that method 500 may be applied to any level of windows, panes, objects, and/or any other organizational or hierarchical vehicle for the layout of content, groups of content, and/or subgroups of content. For example, method 500 may be applied to a group of one or more windows displayed on a desktop area of a display in a graphical user interface type operating system. Furthermore, the panes and/or windows may correspond to one or more video or audio/video streams and or files rendered on a display, for example in a set top box type platform and or computer media center where a display may display video streams in one or more panes or windows on the display, wherein the method 500 is not limited to any particular type of content or type of platform on which the software program may be executed, and the scope of the claimed subject matter is not limited in these respects.

Figure 6:
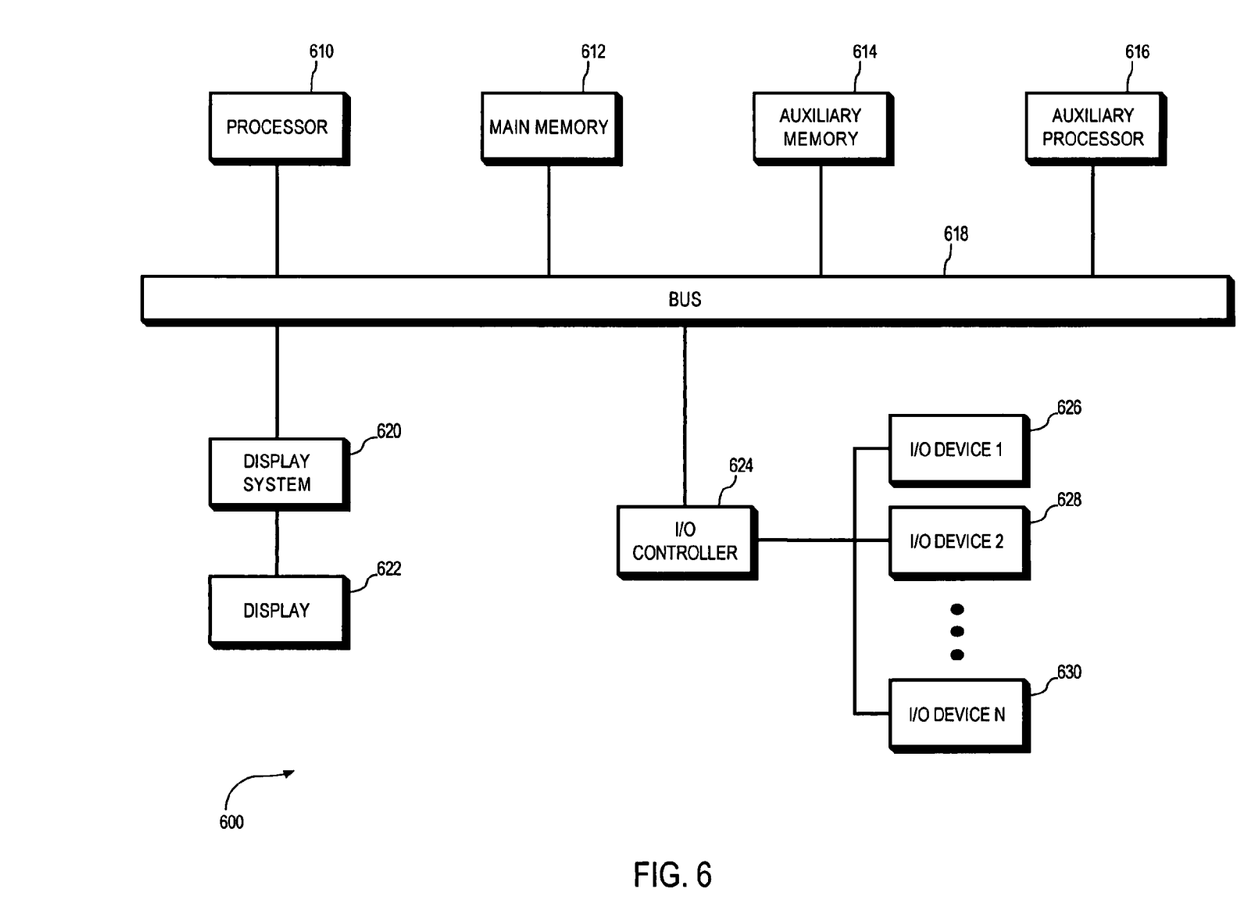
FIG. 6 is a block diagram of an information handling system in accordance with one or more embodiments.

Referring now to FIG. 6, a block diagram of an information handling system in accordance with one or more embodiments will be discussed. Information handling system 600 as shown in FIG. 6 may tangibly embody a computing platform on which a software program as discussed with respect to FIG. 1 through FIG. 4, may be executed to implement GUI 100 and/or in which window 110 may be displayed. Such a computer program and/or machine readable instructions may be tangibly stored on a computer and/or machine readable medium such as a compact disk (CD), digital versatile disk (DVD), flash memory device, hard disk drive (HDD), and so on. Information handling system 600 as shown in FIG. 6 may represent one embodiment of such a computing platform, wherein information handling system may include fewer and/or more blocks to implement various types of computing platforms as desired, and the scope of the claimed subject matter is not limited in this respect.

As shown in FIG. 6, information handling system 600 may be controlled by processor 610. Processor 610 may comprise a central processing unit such as a microprocessor or microcontroller for executing programs, performing data manipulations and controlling the tasks of information handling system 600. Communication with processor 600 may be implemented via bus 618 for transferring information among the components of information handling system 600. Bus 618 may include a data channel for facilitating information transfer between storage and other peripheral components of information handling system 618. Bus 618 further may provide a set of signals utilized for communication with processor 610, including, for example, a data bus, and address bus, and/or a control bus. Bus 618 may comprise any bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 612, and/or auxiliary memory 614. Information handling system 600 may further comprise auxiliary processing processor 616, which may be another processor, a digital signal processor, and so on. Main memory 612 may provide storage of instructions and data for programs to be executed by processor 610. Main memory 612 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), and so on. Auxiliary memory 612 may be utilized to store instructions and/or data that to be loaded into main memory 612 before execution. Auxiliary memory 614 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 614 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 600 optionally include auxiliary processor 616 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any slave type processor subordinate to processor 610, an additional microprocessor and/or controller for dual and/or multiple processor systems, and/or a coprocessor and/or additional processor. Such auxiliary processors may be discrete processors and/or or may be arranged in the same package as processor 610, for example in a multicore and/or multithreaded processor, however the scope of the claimed subject matter is not limited in these respects.

Information handling system 600 further may include display system 620 for connecting to display 622, and further may include input/output (I/O) controller 624 to connect to one or more I/O devices including, for example, I/O device 626, I/O device 628, up to an Nth I/O device, I/O device 630. Display system 620 may comprise a video display adapter having components for driving display 622, including, for example, video memory, a buffer, and/or a graphics engine. Such video memory may be, for example, video random access memory (VRAM), synchronous graphics random access memory (SGRAM), windows random access memory (WRAM), and/or the like. Display 622 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 624 may comprise one or more controllers and/or adapters to prove interface functions between one or more of I/O device 626, I/O device 628, and/or I/O device 630. For example, input/output controller 624 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electro-acoustic transducer, microphone, speaker, audio amplifier, and/or the like. Input/output controller 624 and/or I/O device 626, I/O device 628, and/or I/O device 630 may provide and/or receive analog and/or digital signals to communicate between information handling system and external devices, networks, and/or information sources. Input/output controller 624 and/or I/O device 626, I/O device 628, and/or I/O device 630 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 400 of FIG. 6 is merely one example of an information handling system and/or computing platform, and the scope of the claimed subject matter is not limited in this respect.

Figure 7:
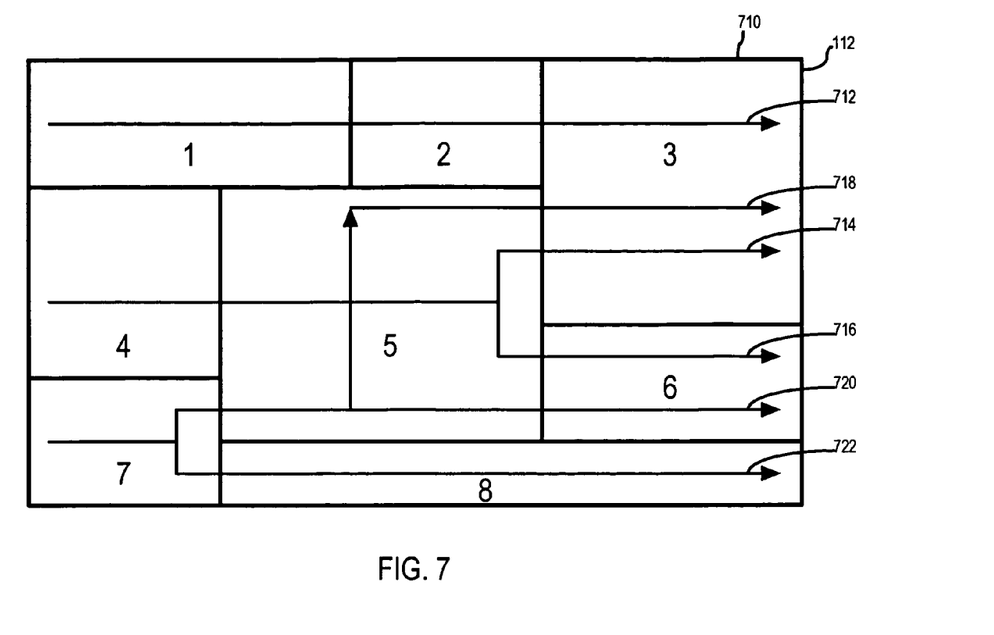
FIG. 7 is a diagram of horizontal path flows for a reflowing of one or more panes in accordance with one or more embodiments.
Figure 8:
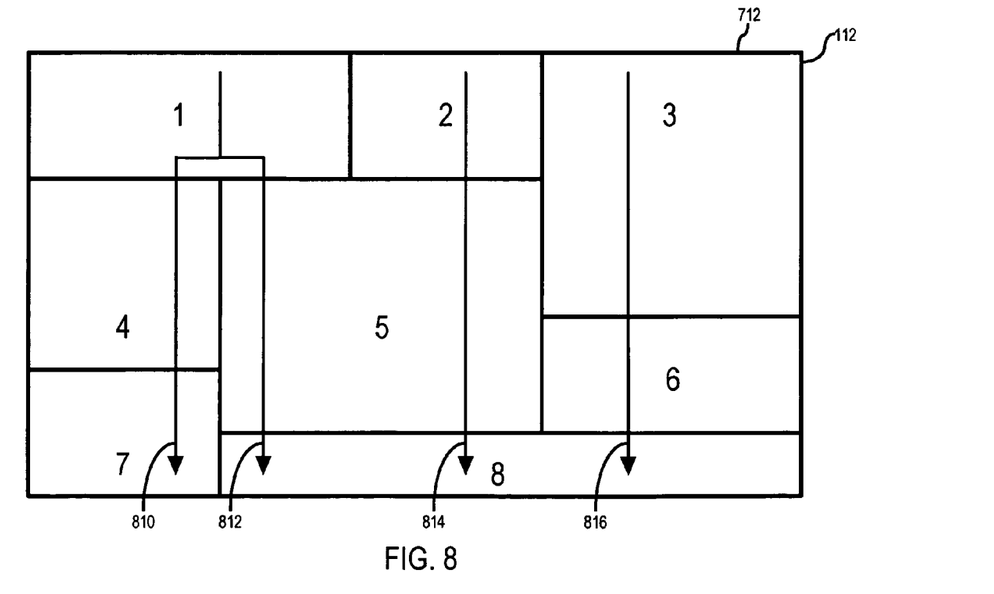
FIG. 8 is a diagram of vertical path flows for a reflowing of one or more panes in accordance with one or more embodiments.

Referring now to FIGS. 7 and 8, horizontal path flows and vertical path flows for a reflowing of one or more panes in accordance with one or more embodiments will be discussed. As shown in FIG. 7, an array of panes 710 in a given layout may occupy all or nearly all of client area 112 as discussed herein. In FIG. 7, panes 1-7 are shown. When the layout of panes 710 is reflowed, for example due to resizing of an individual pane or the as a result of an entire client area or window being resized, in one or more embodiments it may be desirable to not allow any empty space, or nearly any empty space, in client area 112. To ensure all or nearly all of the empty space of client area 112 is occupied by panes 710, and also to optionally ensure that any change in client area 112 is proportionally propagated across all of panes 710, for example to maintain a consistent aspect ratio, such relayout of panes 710 may be accomplished as follows. In one or more embodiments, such a relayout of panes may be considered a two-dimensional path analysis. For each pane, the pane may have a two dimensional value representing a percentage of the overall width and/or the overall height of the overall width and/or height of client area 112 which the pane occupies. For example, pane 1 may occupy 33% of the overall width of client area 112, and may occupy 30% of the overall height of client area 112. As client area 112 is resized, for example, one or more or all of panes 710 may maintain their respective percentages.

In one or more embodiments, if a user manually resizes a pane, then new percentages for panes 710 may be recalculated. To maintain the percentages for one or more of panes 710 when client area 112 is resized, a two-dimensional analysis may be followed. FIG. 7 shows an example path analysis for the reflow in a horizontal direction, and FIG. 8 shows an example path analysis for the reflow in a vertical direction. For a horizontal direction, possible paths are as follows. Path 1 as shown by line 712 follows panes 1, 2, and 3. Path 2 as shown by line 714 follows panes 4, 5, and 3. Path 3 as shown by line 716 follows panes 4, 5, and 6. Path 4 as shown by line 718 follows panes 7, 5, 3. Path 5 as shown by line 720 follows panes 7, 5, 6. Path 6 as shown by line 722 follows panes 7 and 8. If client area 112 is made wider, a greater number of pixels in client area may result, referred to as a positive delta in the amount of pixels. The delta may be distributed across one or more of panes 710 so that the percentage widths for panes 710 does not change or results in a negligible change. A determination of the change in pixels of client area may be determined to be a given number of pixels, delta width (dW) To distribute the delta width (dW) in pixels across one or more of panes, new pane widths in pixels may be calculated as follows. The pane delta width for pane 1 may be the current pane width percentage multiplied by dW, the pane delta width for pane 2 may be the current pane width percentage multiplied by dW, and so on. The panes may then be increased in width by the resulting respective pane delta widths. Once one or more of panes 710 have been increased, one or more of the paths may be walked to determine whether the width of a given pane is still the same percentage of the overall width of client area 112. If this is determined to be the case, then the width reflow is done. However, if it is determined that a pane width for a given pane is not its pane width percentage for one or more of the panes, a correction in the pixel width of one or more of panes may be implemented. In one or more embodiments, pane widths may be rounded upwards if currently lower than the pane width percentage, or downwards if currently higher than the pane width percentage. A left over fraction of pixels may then be propagated along the path or paths. Such a process may be referred to as floating point error correction. By propagating a floating point error from one pane to another along one or more of the paths and then calculating a width of a pane after adding the floating point error to the width of that pane, all of the pixels in the increased width of client area 112 may be accounted for by the widths of panes 710.

In one or more embodiments, the same or a similar process likewise may be followed for vertical changes in client area 112 as shown in FIG. 8 as may be followed for horizontal changes as shown in FIG. 7. As shown in FIG. 8, vertical paths may be as follows. Path 1 as shown by line 810 may follow panes 1, 4, and 7. Path 2 as shown by line 812 may follow panes 1, 5, and 8. Path 3 as shown by line 814 may follow panes 2, 5, and 8. Path 4 as shown by line 816 may follow panes 3, 6, and 8. The same or similar process as discussed with respect to FIG. 7 for horizontal changes in client area 112 may likewise be applied along the vertical paths as shown in FIG. 8 using the panes height percentages instead of horizontal percentages. As a result of following the horizontal paths shown in FIG. 7 and/or vertical paths shown in FIG. 8, changes in client area 112 may be proportionally applied to all or nearly all of panes 710 to result in the desired aspect ratios for panes 710 when a change in client area 112 is relayed out for panes 710. If a given pane is itself resized, removed, or added to client area 112, one or more of panes 710 may be rearranged as discussed herein, and new pane width and height percentages may be calculated for pane reflow as shown in FIGS. 7 and 8, although the scope of the claimed subject matter is not limited in these respects.

Although the claimed subject matter has been described with a certain degree of particularity, it should be recognized that elements thereof may be altered by persons skilled in the art without departing from the spirit and/or scope of the claimed subject matter. It is believed that implementations of screen relayout and/or many of its attendant applications will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    displaying, on a display device, two or more panes in a window, wherein each one of the two or more panes is independently resizable, and wherein the two or more panes are arranged in a first layout, the window having a first preset aspect ratio;
    in response to receiving a selection of a user interface element representing a second preset aspect ratio, changing the first preset aspect ratio of the window to the second preset aspect ratio; and
    in response to said changing, rearranging each pane in the window into a second layout, wherein said rearranging each pane in the window comprises maintaining a relationship between at least two panes of the two or more panes, and wherein said rearranging each pane in the window comprises reflowing content within a subset of the two or more panes while not reflowing content within another subset of the two or more panes.

2. The method as claimed in claim 1, further comprising at least partially maintaining a characteristic of the first layout in the second layout in response to the change in the first preset aspect ratio of the window to the second preset aspect ratio, wherein the characteristic comprises one or more of a total area within the window occupied by the two or more panes, a spatial relationship of one or more of the two or more panes to one or more other panes of the two or more panes, a percentage occupancy of the two or more panes within a portion of the window, or combinations thereof.

3. The method as claimed in claim 1, wherein said rearranging comprises reflowing the at least two panes of the two or more panes at least partially in proportion to a change from the first preset aspect ratio to the second preset aspect ratio.

4. The method as claimed in claim 1, wherein all visible portions of the two or more panes are visible within the window in the first layout and in the second layout, or wherein all the panes occupy all or most of an area of the window in the first layout and in the second layout, or combinations thereof.

5. An apparatus, comprising:
    means for displaying, on a display device, two or more panes in a window, wherein each one of the two or more panes is independently resizable, and wherein the two or more panes are arranged in a first layout, the window having a first preset aspect ratio;
    means for, in response to receiving a selection of a user interface element representing a second preset aspect ratio, changing the first preset aspect ratio of the window to the second preset aspect ratio; and
    means for, in response to said changing, rearranging each pane in the window into a second layout, wherein said rearranging each pane in the window comprises maintaining a relationship between at least two panes of the two or more panes, and wherein said rearranging each pane in the window comprises reflowing content within a subset of the two or more panes while not reflowing content within another subset of the two or more panes.

6. The apparatus as claimed in claim 5, wherein the means for rearranging is capable of at least partially maintaining a characteristic of the first layout in the second layout in response to the change in the first preset aspect ratio of the window to the second preset aspect ratio, wherein the characteristic comprises one or more of a total area within the window occupied by the two or more panes, a spatial relationship of one or more of the panes to one or more other panes of the two or more panes, a percentage occupancy of the two or more panes within a portion of the window, or combinations thereof.

7. The apparatus as claimed in claim 5, wherein said means for rearranging comprises means for reflowing the at least two of the two or more panes at least partially in proportion to a change from the first preset aspect ratio to the second preset aspect ratio.

8. The apparatus as claimed in claim 5, wherein said means for rearranging comprises means for reflowing a subset of the two or more panes and means for not reflowing another subset of the two or more panes.

9. The apparatus as claimed in claim 5, wherein all visible portions of the two or more panes are visible within the window in the first layout and in the second layout, or wherein all the panes occupy all or most of an area of the window in the first layout and in the second layout, or combinations thereof.

10. A non-transitory computer-readable medium having instructions stored thereon that are executable by one or more processors to:
    display, on a display device, two or more panes in a window, wherein each one of the two or more panes is independently resizable, and wherein the two or more panes are arranged in a first layout, the window having a first preset aspect ratio;

in response to receiving a selection of a user interface element representing a second preset aspect ratio, change the first preset aspect ratio of the window to the second preset aspect ratio; and in response to said changing, rearrange each pane in the window into a second layout, wherein said rearranging each pane in the window comprises maintaining a relationship between at least two of the two or more panes, and wherein said rearranging each pane in the window comprises reflowing content within a subset of the two or more panes while not reflowing content within another subset of the two or more panes.

11. The non-transitory computer-readable medium as claimed in claim 10, wherein the instructions are further executable by the one or more processors to at least partially maintaining a characteristic of the first layout in the second layout in response to the change in the first preset aspect ratio of the window to the second preset aspect ratio, wherein the characteristic comprises one or more of a total area within the window occupied by the two or more panes, a spatial relationship of one or more of the two or more panes to one or more other panes of the two or more panes, a percentage occupancy of the two or more panes within a portion of the window, or combinations thereof.

12. The non-transitory computer-readable medium as claimed in claim 10, wherein said instructions are further executable by the one or more processors to rearrange said panes by reflowing the at least two panes of the two or more panes at least partially in proportion to a change from the first preset aspect ratio to the second preset aspect ratio.

13. The non-transitory computer-readable medium as claimed in claim 10, wherein said instructions are further executable by the one or more processors rearrange said panes by reflowing a subset of the two or more panes and not reflowing another subset of the two or more panes.

14. The non-transitory computer-readable medium as claimed in claim 10, wherein all visible portions of the two or more panes are visible within the window in the first layout and in the second layout, or wherein all the panes occupy all or most of an area of the window in the first layout and in the second layout, or combinations thereof.

15. A method, comprising:

displaying, on a display device, two or more panes in a window, wherein each one of the two or more panes is independently resizable, wherein the two or more panes are arranged in a first layout, and wherein the window has a first preset aspect ratio;

in response to receiving a selection of a user interface element representing a second preset aspect ratio, changing the first preset aspect ratio of the window to a second preset aspect ratio, wherein said changing comprises changing a characteristic of at least one pane of the two or more panes of the first layout, wherein said changing comprises maintaining a characteristic of at least one other pane of the two or more panes of the first layout, and wherein said maintaining the characteristic comprises proportionally reflowing content of the at least one other pane of the two or more panes of the first layout; and in response to said changing, rearranging the at least one pane of the two or more panes to accommodate the changed characteristic in a second layout of the two or more panes.

16. The method as claimed in claim 15, wherein the characteristic comprises one or more of a total area of a pane, a quantity of panes within the first layout, or combinations thereof.

17. The method as claimed in claim 15, wherein said rearranging comprises reflowing the at least one pane of the two or more panes at least partially in proportion to the changed characteristic.

18. The method as claimed in claim 15, wherein said rearranging comprises reflowing a subset of the two or more panes and not reflowing another subset of the two or more panes.

19. The method as claim 15, wherein all visible portions of the two or more panes are visible within the window in the first layout and in the second layout, or wherein all the panes occupy all or most of an area of the window in the first layout and in the second layout, or combinations thereof.

20. An apparatus, comprising:

means for displaying, on a display device, two or more panes in a window, wherein each one of the two or more panes is independently resizable, wherein the two or more panes are arranged in a first layout, and wherein the window has a first preset aspect ratio;

means for, in response to receiving a selection of a user interface element representing a second preset aspect ratio, changing the first preset aspect ratio of the window to a second preset aspect ratio, wherein said changing comprises changing a characteristic of at least one pane of the two or more panes of the first layout, wherein said changing comprises maintaining a characteristic of at least one other pane of the two or more panes of the first layout, and wherein said maintaining the characteristic comprises proportionally reflowing content of the at least one other pane of the two or more panes of the first layout; and means for, in response to said changing, rearranging the at least one pane of the two or more panes to accommodate the changed characteristic in a second layout of the two or more panes.

21. The apparatus as claimed in claim 20, wherein the characteristic comprises one or more of a total area of a pane, a quantity of panes within the first layout, or combinations thereof.

22. The apparatus as claimed in claim 20, wherein said means for rearranging comprises means for reflowing the at least one pane of the two or more panes at least partially in proportion to the changed characteristic.

23. The apparatus as claimed in claim 20, wherein said means for rearranging comprises means for reflowing a subset of the two or more panes and means for not reflowing another subset of the two or more panes.

24. The apparatus as claim 20, wherein all visible portions of the two or more panes are visible within the window in the first layout and in the second layout, or wherein all the panes occupy all or most of an area of the window in the first layout and in the second layout, or combinations thereof.

25. A non-transitory computer-readable medium having instructions stored thereon that are executable by one or more processors to:

display, on a display device, two or more panes in a window, wherein the two or more panes are arranged in a first layout, and wherein the window has a first preset aspect ratio;

in response to receiving a selection of a user interface element representing a second preset aspect ratio, change the first preset aspect ratio of the window to a second preset aspect ratio, wherein said change comprises changing a characteristic of at least one pane of the two or more panes of the first layout, wherein said change comprises maintaining a characteristic of at least one other pane of the two or more panes of the first layout, and wherein said maintaining the characteristic comprises proportionally reflowing content of the at least one other pane of the two or more panes of the first layout; and in response to said changing, rearrange the at least one pane of the two or more panes to accommodate the changed characteristic in a second layout of the two or more panes.

26. The non-transitory computer-readable medium as claimed in claim 25, wherein the characteristic comprises one or more of a total area of a pane, a quantity of panes within the first layout, or combinations thereof.

27. The non-transitory computer-readable medium as claimed in claim 25, wherein said instructions are further executable by the one or more processors to rearrange said panes by reflowing at least two or more panes at least partially in proportion to a changed characteristic.

28. The non-transitory computer-readable medium as claimed in claim 25, wherein said instructions are further executable by the one or more processors to rearrange said panes by reflowing a subset of the two or more panes and not reflowing another subset of the two or more panes.

29. The non-transitory computer-readable medium as claimed in claim 25, wherein all visible portions of the two or more panes are visible within the window in the first layout and in the second layout, or wherein all the panes occupy all or most of an area of the window in the first layout and in the second layout, or combinations thereof.

* * * * *